United States Patent
Kelly (10) Patent No.: US 11,872,793 B2
(45) Date of Patent: Jan. 16, 2024

(54) METHOD OF PREPARING ANTIMICROBIAL SHEETS FOR ARTICLES OF MANUFACTURE HAVING ANTIMICROBIAL PROPERTIES

(71) Applicant: Patrick Kelly, Villa Park, CA (US)

(72) Inventor: Patrick Kelly, Villa Park, CA (US)

(*) Notice: Subject to any disclaimer, the term of this patent is extended or adjusted under 35 U.S.C. 154(b) by 0 days.

(21) Appl. No.: 17/241,969

(22) Filed: Apr. 27, 2021

(65) Prior Publication Data

US 2021/0331458 A1 Oct. 28, 2021

Related U.S. Application Data

(60) Provisional application No. 63/015,970, filed on Apr. 27, 2020.

(51) Int. Cl.
| | |
|---|---|
| *B32B 37/00* | (2006.01) |
| *A01N 25/34* | (2006.01) |
| *A01N 25/10* | (2006.01) |
| *A01N 59/20* | (2006.01) |
| *B32B 15/20* | (2006.01) |
| *B32B 15/06* | (2006.01) |
| *B32B 25/20* | (2006.01) |
| *B32B 25/10* | (2006.01) |

(52) U.S. Cl.
CPC ............ *B32B 37/156* (2013.01); *A01N 25/10* (2013.01); *A01N 25/34* (2013.01); *A01N 59/20* (2013.01); *B32B 15/06* (2013.01); *B32B 15/20* (2013.01); *B32B 25/10* (2013.01); *B32B 25/20* (2013.01); *B32B 2305/77* (2013.01); *B32B 2307/7145* (2013.01)

(58) Field of Classification Search
CPC .......... B32B 37/156; B32B 2307/7145; B32B 25/10; B32B 25/20; B32B 15/06; B32B 15/20; B32B 2305/77; A01N 25/34; A01N 59/20; A01N 25/10
See application file for complete search history.

(56) References Cited

U.S. PATENT DOCUMENTS

| | | | |
|---|---|---|---|
| 5,395,305 A | 3/1995 | Koida et al. | |
| 5,869,172 A * | 2/1999 | Caldwell | A61F 13/49003 |
| | | | 428/306.6 |

(Continued)

*Primary Examiner* — Nathan L Van Sell
(74) *Attorney, Agent, or Firm* — Jafari Law Group, Inc.

(57) ABSTRACT

A method of preparing antimicrobial material sheets suitable for manufacturing a wide range of products having antimicrobial properties. In exemplary embodiments, a fabric having antimicrobial agents may be calendered with a polymer such as a silicone compound or an elastomer, in order to create a fused material sheet that contains the antibacterial properties of the fabric. In exemplary embodiments, the antimicrobial agent is copper, a copper alloy, silver, a silver alloy, or other suitable antimicrobial agent from which a fabric may be created. In some exemplary embodiments, an uncured silicone composition and copper alloy fabric are calendered to obtain an antimicrobial material sheet suitable for compression molding a wide range of products. In some exemplary embodiments, an uncured silicone composition and copper alloy fabric are calendered and roto-cured to obtain a cured antimicrobial material sheet or sheet rolls that maybe suitable for die-cutting.

22 Claims, 7 Drawing Sheets

(56) References Cited

U.S. PATENT DOCUMENTS

| | | | |
|---|---|---|---|
| 5,876,792 A * | 3/1999 | Caldwell | D06M 15/653 |
| | | | 427/171 |
| 7,351,368 B2 | 4/2008 | Abrams | |
| 9,913,476 B2 | 3/2018 | Agrawal et al. | |
| 10,034,478 B2 | 7/2018 | Krasnow et al. | |
| 10,105,875 B2 | 10/2018 | Young et al. | |
| 2003/0064232 A1 * | 4/2003 | Allen | C08L 83/06 |
| | | | 428/447 |
| 2003/0152632 A1 | 8/2003 | Sabesan | |
| 2004/0214495 A1 * | 10/2004 | Foss | B32B 27/306 |
| | | | 442/364 |
| 2005/0272334 A1 * | 12/2005 | Wang | D06M 11/49 |
| | | | 442/93 |
| 2010/0136073 A1 | 6/2010 | Preuss | |
| 2010/0190004 A1 | 7/2010 | Gibbins | |
| 2012/0294919 A1 | 11/2012 | Jaynes | |
| 2013/0315972 A1 | 11/2013 | Krasnow et al. | |
| 2014/0308867 A1 * | 10/2014 | Van Emmerick | C23C 14/20 |
| | | | 442/189 |
| 2015/0218390 A1 | 8/2015 | Palza Cordero et al. | |
| 2015/0233052 A1 * | 8/2015 | Tung | D06M 15/70 |
| | | | 8/641 |
| 2016/0191095 A1 | 6/2016 | Santelli | |
| 2016/0212252 A1 | 7/2016 | Parker | |
| 2017/0130377 A1 | 5/2017 | Coates et al. | |
| 2017/0341271 A1 | 11/2017 | Vogt et al. | |
| 2018/0028717 A1 | 2/2018 | Soffiatti et al. | |
| 2019/0021314 A1 | 1/2019 | Katagiri et al. | |
| 2019/0144738 A1 | 5/2019 | Agrawal et al. | |

* cited by examiner

METHOD OF PREPARING ANTIMICROBIAL SHEETS FOR ARTICLES OF MANUFACTURE HAVING ANTIMICROBIAL PROPERTIES

PRIORITY NOTICE

The present application claims priority to U.S. Provisional patent application with Ser. No. 63/015,970, filed on Apr. 27, 2020, the disclosure of which is incorporated herein by reference in its entirety.

TECHNICAL FIELD OF THE INVENTION

The present invention relates generally to manufacturing products with antimicrobial properties. More specifically, the present invention relates to a method of preparing antimicrobial material sheets suitable for manufacturing a wide range of products having antimicrobial properties.

COPYRIGHT AND TRADEMARK NOTICE

A region of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

At the time of the filing of this application the world is experiencing a pandemic. The current situation involves a virus that has been identified as COVID-19. As COVID-19 cases are rising, there is a tremendous need for means of helping prevent or reduce transmission of the disease. Information regarding disinfecting procedures and means of avoiding transmission have been disseminated to the public at large.

For example, it is believed that the virus survives on certain surfaces longer than it does on others. Apparently, while the virus tends to survive on metal for shorter periods of time, the virus may survive on cardboard for as long as 24 hours. This type of information has changed the way individuals treat ordinary objects. For example, offices implement new strategies for picking up their mail, often leaving it untouched for a day before opening it up. Similarly, certain high touch surfaces are treated as potentially more likely to be contaminated with contagious microorganisms and picked up by others by their hands, then readily transferred to the nose and eyes. For example, door handles, switches, tables, desks, and shared equipment at work and home.

Generally, one way to help prevent the wide transmission of this virus, and other types of infectious diseases, is to minimize the time during which the virus, bacteria, or other microbe that helps transmit or carry a disease, survives on a particular object or surface. For example, surfaces can be treated with disinfectant to kill a virus in minutes or even seconds. The limitations of this approach are that disinfecting the surface—like a table, a kitchen floor, an exercise machine, a toy, or an exercise or yoga mat—can be cumbersome if it is required every single time the object is being used. Accordingly it would be desirable if everyday objects could comprise materials that are less likely to be carrying microbes such as viruses, bacteria, and other microbials that are responsible for contagious diseases including but not limited to the respiratory illnesses caused by the COVID-19.

It is now widely known about the antimicrobial effect of various metals. Silver, for example, has beneficial healing and anti-disease properties, and has been used to store water, wine, and vinegar to prevent spoiling. The exact process of silver's germicidal effect is still not entirely understood, but silver is widely used in topical gels and impregnated into bandages because of its wide-spectrum antimicrobial activity.

Similarly, copper has long been used as a biostatic surface to line the bottoms of ships for preventing fouling of ships' hulls; bacteria will not grow on a copper surface because it is biostatic. Copper alloys have become important netting materials in the aquaculture industry for the fact that they are antimicrobial and prevent biofouling and have strong structural and corrosion-resistant properties in marine environments. Copper alloy touch surfaces have recently been investigated as antimicrobial surfaces in hospitals for decreasing transmission of nosocomial infections.

Accordingly, it would be advantageous and highly desirable to provide for a method of manufacturing products that employed such antimicrobial properties, so that everyday objects can be constructed of surfaces that avoid or minimize carrying microbes such as viruses, bacteria, and other germs that are responsible for contagious diseases including but not limited to COVID-19.

It is to these ends that the present invention has been developed.

BRIEF SUMMARY OF THE INVENTION

According to the present invention, a method for manufacturing articles that comprise of antimicrobial properties is described.

Generally, the invention is a method of preparing antimicrobial material sheets suitable for manufacturing a wide range of products having antimicrobial properties. This may be achieved using cost-efficient materials, and in a cost-efficient manner. In exemplary embodiments, a fabric having antimicrobial agents may be calendered with a polymer, for example a synthetic or semi-synthetic plastic, a thermoplastic, an elastomer, a silicone or silicone-based material, or any other similar polymer in order to create a fused material sheet that contains the antibacterial properties of the fabric. In exemplary embodiments, the antimicrobial agent is copper, a copper alloy, silver, a silver alloy, or other suitable agent or material from which a fabric may be created. In some exemplary embodiments, the fabric is a copper alloy fabric, and the polymer is a silicone composition. In some exemplary embodiments, an uncured silicone composition and copper alloy fabric are simply calendered to obtain an antimicrobial material sheet suitable for manufacturing a wide range of products having surfaces with antimicrobial properties, including for example via compression molding. In some exemplary embodiments, the fabric, or metalized textiles, to be used will depend on the nature of the application, i.e. tear strength needed. For example, the fabric or metalized textile can be woven, non-woven or knit. In some exemplary embodiments, an uncured silicone composition and copper alloy fabric are roto-cured to obtain a cured antimicrobial material sheet suitable for distribution to manufacturers of products, including for example via die-cutting portions of the cured antimicrobial material sheets for fabrication.

In one example, a method of preparing antimicrobial material sheets suitable for manufacturing a wide range of products having antimicrobial properties is provided. The method may include: providing at least a layer of a fabric comprising an antimicrobial material; providing at least a layer of an uncured polymer; creating a preparation sheet including the antimicrobial fabric and the uncured polymer; and calendering the preparation sheet to create an antimicrobial material sheet that is suitable for fabricating articles of manufacture having antimicrobial properties.

In another example, a method of preparing a cured antimicrobial material sheet is provided. The method may include: providing at least a layer of a fabric comprising an antimicrobial material; providing at least a layer of an uncured polymer; creating a preparation sheet including the antimicrobial fabric and the uncured polymer; calendering the preparation sheet to create an antimicrobial material sheet; and roto-curing the antimicrobial material sheet to form a cured antimicrobial material sheet.

In yet another example, a method of processing an antimicrobial material sheet for fabrication of antimicrobial products is provided. The method may include: creating a preparation sheet including at least a layer of a copper alloy fabric having antimicrobial properties and at least a layer of a polymer composition such as a silicone composition; calendaring the preparation sheet to form an antimicrobial material sheet; and compression molding a portion of the antimicrobial material sheet to form at least a portion of a product.

In yet another example, a method of processing an antimicrobial material sheet for fabrication of antimicrobial products is provided. The method may include: creating a preparation sheet including at least a layer of a copper alloy fabric having antimicrobial properties and at least a layer of a polymer composition such as a silicone composition; curing the preparation sheet to form an antimicrobial material sheet; and die-cutting a portion of the antimicrobial material sheet to form at least a portion of a product.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components, protocols, methods and/or functional or sequential relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

In the following disclosure, the term microbe may refer to viruses, bacteria, fungus, or any type of germ or disease-producing microorganism. The term antimicrobial may refer to any type of antimicrobic or anti-pathogen, including but not limited to any element, biocidal compound, composition, or substance, that may be used for, or has the function of, purpose to, reduce the infectivity of microbes.

Generally, the invention involves methods of preparing antimicrobial material sheets suitable for manufacturing a wide range of products having antimicrobial properties. This may be achieved using cost-efficient materials such as synthetic or semisynthetic compounds and fabrics that include copper or silver. Because the processes employed for creating the antibacterial sheets involve machinery that is well known, the antibacterial material sheets in accordance with the present invention may be prepared in a relatively cost-efficient manner. In exemplary embodiments, the antimicrobial agent is copper, a copper alloy, silver, a silver alloy, or other suitable agent or material from which a fabric may be created. In some exemplary embodiments, the fabric is a copper alloy fabric, and the synthetic or semisynthetic compound is a polymer comprising silicone composition.

Figure 1:
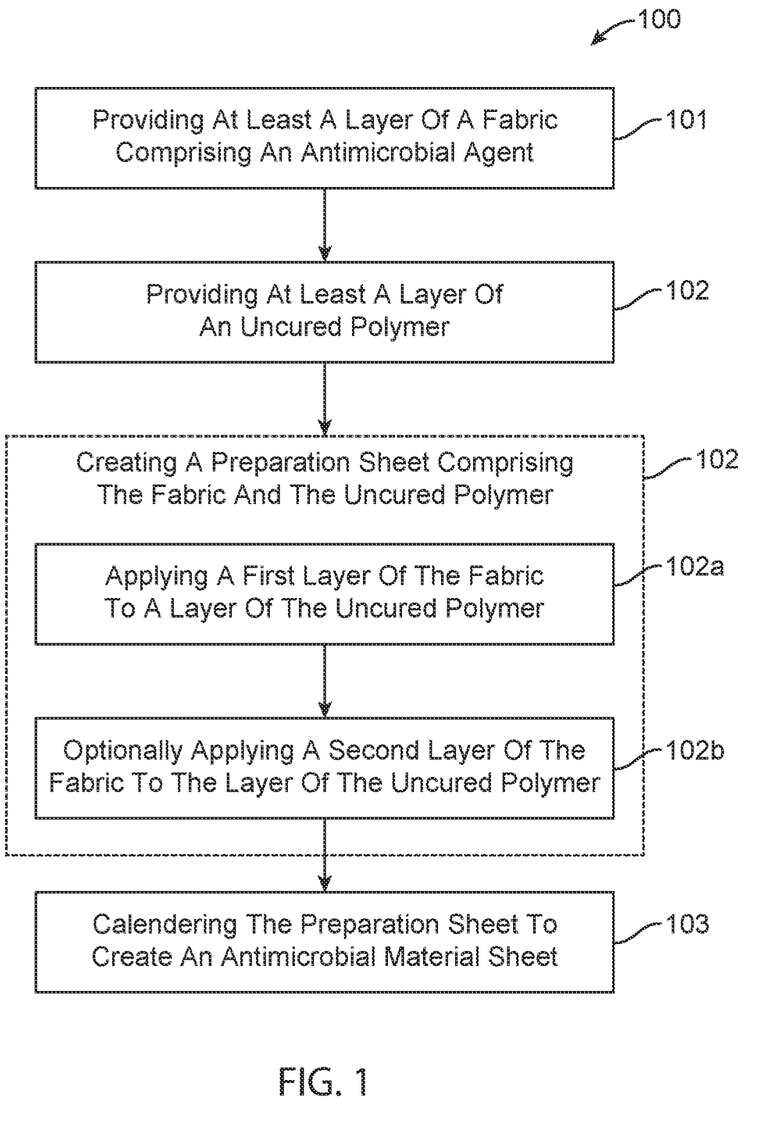
FIG. 1 is a flow chart depicting an exemplary method of preparing antimicrobial material sheets suitable for manufacturing a wide range of products having antimicrobial properties.

Turning now to the figures, FIG. 1 is a flow chart depicting an exemplary method of preparing antimicrobial material sheets suitable for manufacturing a wide range of products having antimicrobial properties. More specifically, FIG. 1 depicts method 100 for preparing antimicrobial material sheets suitable for fabrication of articles of manufacture; although method 100 is exemplarily shown with a series of steps in one particular sequence, method 100 may include fewer or more steps, and or steps in alternative sequences, without deviating from the scope of the present invention.

Method 100 involves an antimicrobial fabric calendered with a polymer such as silicone or an elastomer, in order to create a fused material sheet that contains the antibacterial properties of the fabric. In such exemplary embodiment, an uncured silicone composition and copper alloy fabric are calendered to obtain an antimicrobial material sheet suitable for manufacturing a wide range of products having surfaces with antimicrobial properties, including for example via compression molding.

In step 101, at least a layer of a fabric comprising an antimicrobial material is provided. This may comprise providing a silver fabric, or a copper fabric. In exemplary embodiments, a copper alloy fabric is provided. In step 102, at least a layer of an uncured polymer is provided in order to prepare the layers for calendaring. In exemplary embodiments, the polymer may be any suitable thermoplastic such as an elastomer or a silicone composition. In step 103, a preparation sheet is created, and it is the preparation sheet including the copper-alloy fabric and the uncured polymer, which is calendared.

This step may include step 102a, in which a single layer of the fabric is applied to a layer of the uncured polymer. Optionally, in step 102b, multiple layers on both sides of the polymer layer may be applied in order to prepare the preparation sheet. In step 103, the preparation sheet is calendered to create an antimicrobial material sheet that is suitable for fabricating articles of manufacture having antimicrobial properties.

Without deviating from or limiting the scope of the present invention, any number of calendering techniques may be employed. For example, any calendering or process of smoothing and compressing the preparation sheet may be employed, typically comprising a process of passing a single continuous sheet of the preparation sheet (i.e. the combination of the antimicrobial fabric and uncured polymer) through a number of pairs of rolls. The rolls in combination are called calenders and may be constructed of steel with a hardened surface, typically exerting an adequate pressure to provide a smooth sheet of material. In exemplary embodiments, the resulting uncured antimicrobial material sheets may include sheets with a width of about 25 to 52 inches with by a continuous length, and a ⅛" thickness. As mentioned above, the layer of the antimicrobial fabric, on one or on both sides of the polymer.

Figure 2:
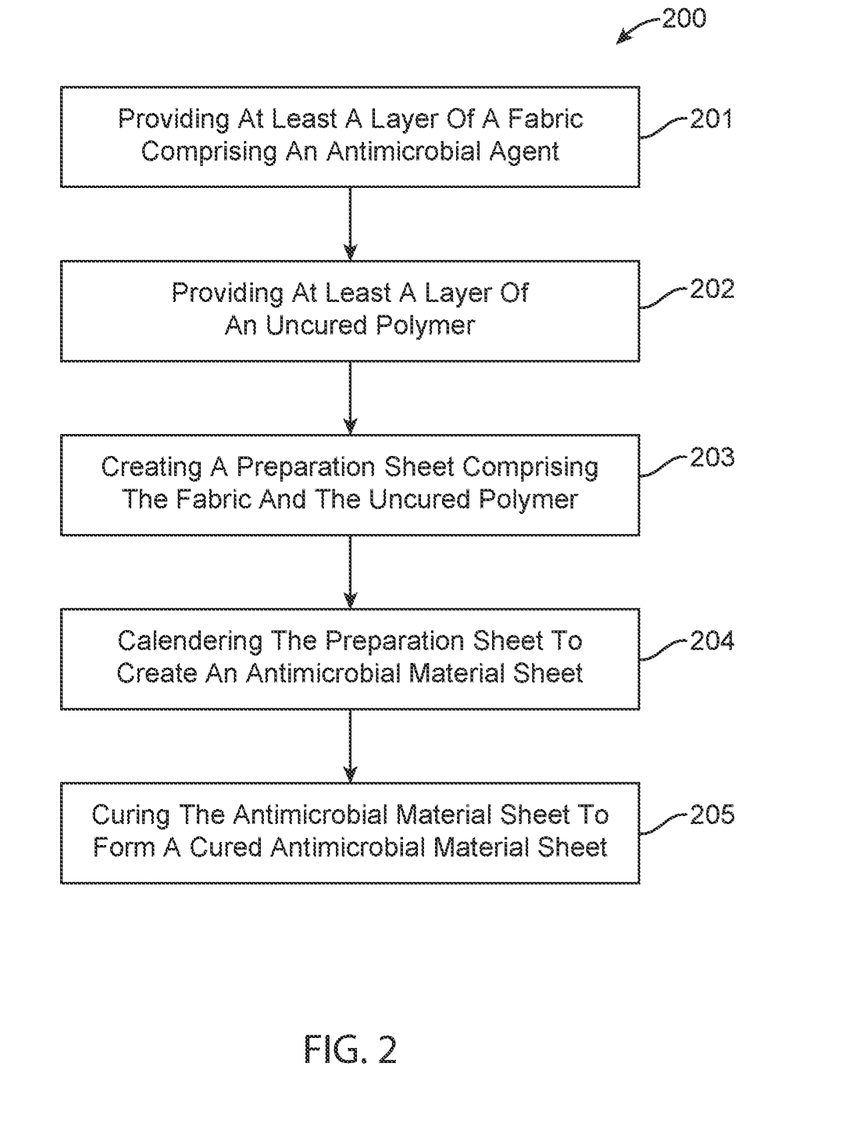
FIG. 2 is a flow chart depicting an exemplary method of preparing a cured antimicrobial material sheets in accordance with the present invention.

In other exemplary methods, the antimicrobial material sheets may instead be cured. For example, and turning now to the next figure, FIG. 2 is a flow chart depicting an exemplary method of preparing cured antimicrobial material sheets in accordance with the present invention. More specifically, FIG. 2 depicts method 200 for preparing cured antimicrobial material sheets; although method 200 is exemplarily shown with a series of steps in one particular sequence, method 200 may include fewer or more steps, and or steps in alternative sequences, without deviating from the scope of the present invention.

Method 200 involves an uncured silicone composition and copper alloy fabric are cured, for example roto-cured or cured using any other suitable means, to obtain a cured antimicrobial material sheet suitable for distribution to manufacturers of products, including for example via die-cutting portions of the cured antimicrobial material sheets for fabrication.

In step 201, one or more layers of a copper or copper-alloy fabric may be provided. In step 202, one or more layers of an uncured polymer is provided to be applied together with the one or more layers of the copper or copper-alloy fabric. In step 203, a preparation sheet including the copper fabric and the uncured polymer is created for calendering. In step 204, the preparation sheet is calendered to create an antimicrobial material sheet. Rather than leaving the antimicrobial sheet uncured, however, a curing process may be employed on the calendered antimicrobial material sheet to form a cured antimicrobial material sheet.

In step 205, the antimicrobial material sheet is cured using a curing process such as a roto curing process. Without limiting the scope of the present invention, a roto cure or rotary curing press may be employed. This machinery is designed for the continuous vulcanization of technical rubber products. Generally, a roto cure is installed to create continuous vulcanization process where the sheet is heated and vulcanized. In exemplary embodiments, rotary curing press is positioned after the calendar utilized in step 204. A typical rotary curing press line in accordance with the present invention may include a winding let-off unit, roto cure, cooling unit, equipment for edge trimming of the final product and winding-up equipment. From the winding let-off unit, a semi-finished calendered material may be led on to the lower roll and from there into pressing space between a heating drum and thrust pressing belt, where it is pressed and vulcanized.

Typically, the calendered material is placed between the drum and the band at the lower roller. With the aid of the tensioning pulley, the band is strained so that a pressure is obtained between the band and the drum. The linear speed of this drum can vary depending on the material's thickness and rate of vulcanization. The drum can have completely smooth or patterned surfaces and normally has varying diameters and a width commensurate with the requirements of the final product. Furthermore, curing times may depend on a variety of factors, including the speed and a contact length of the drums. Generally, a set up should yield high hourly output, long lifespan, low energy consumption and high reliability, with antibacterial material sheets having a width of about 25 to 52 inches with a continuous length, and ⅛" inch thickness. Without limiting the scope of the present invention, other means of curing the antimicrobial material sheet may be employed. For example, in some embodiments, a fabricator with calendaring capabilities may opt to cure the calendared sheets using an Autoclave curing method. This generally involves taking the calendered rolls and placing them into large kettles where high pressure steam applied for various lengths of time and at a particular range temperature in order to cure the material sheet.

Figure 3:
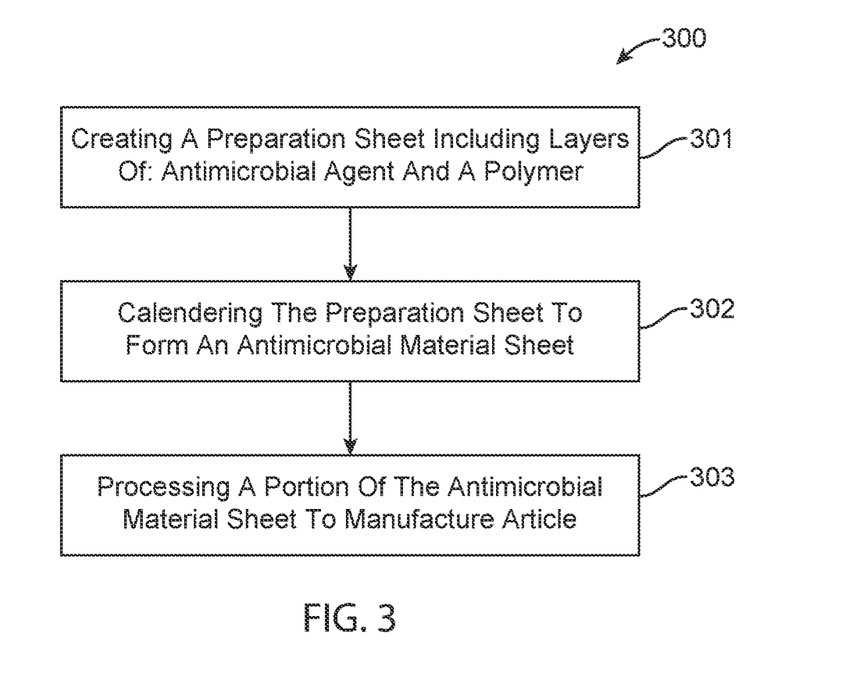
FIG. 3 is a flow chart depicting an exemplary method of processing an antimicrobial material sheet for fabrication of antimicrobial products, comprising compression molding.

Turning now to the next figure, FIG. 3 is a flow chart depicting an exemplary method of processing an antimicrobial material sheet for fabrication of antimicrobial products, comprising compression molding or other means of processing uncured antimicrobial material sheets. More specifically, FIG. 3 depicts method 300 for processing an antimicrobial material sheet for fabrication of antimicrobial products; although method 300 is exemplarily shown with a series of steps in one particular sequence, method 300 may include fewer or more steps, and or steps in alternative sequences, without deviating from the scope of the present invention. Method 300 involves a creating uncured antibacterial sheets, which may then be compression molded into products that will have antimicrobial properties.

In step 301, a preparation sheet including at least a layer of a copper alloy fabric having antimicrobial properties and at least a layer of a polymer composition such as a silicone composition may be created. In step 302, the preparation sheet may be calendered in order to form an antimicrobial material sheet. In step 303, the calendered antimicrobial material sheet may be processed, by for example and without limiting the scope of the present invention, employing a compression molding process to a portion of the antimicrobial material sheet in order to form at least a portion of a product. In some exemplary embodiments, a fabricator may, instead of employing compression molding presses, hand wrap or mandrel build a part or article of manufacture and cure it in a hot air oven or small Autoclave; in such embodiments, a specific curing agent may be used in an elastomer recipe for these manufacturing processes. As may be appreciated by a person of ordinary skill in the art, the product may include any product that is suitably constructed via compression molding techniques such as household products, toys, exercise devices, dishware, food trays, place mats, or any other type of product or surface that may desirably employ antimicrobial properties.

Figure 4:
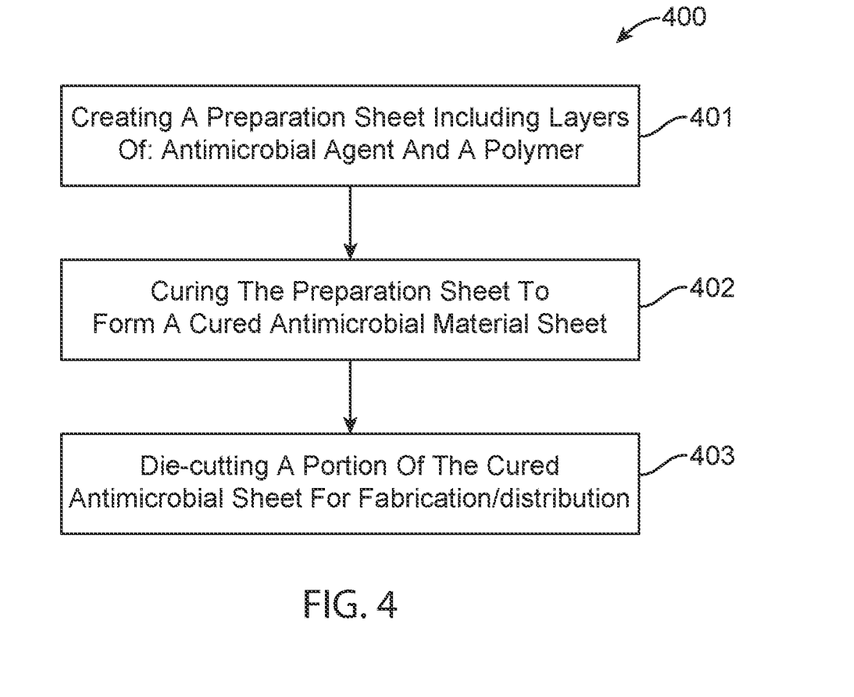
FIG. 4 is a flow chart depicting an exemplary method of processing an antimicrobial material sheet for fabrication of antimicrobial products, comprising die cutting.

Turning now to the next figure, FIG. 4 is a flow chart depicting an exemplary method of processing an antimicrobial material sheet for fabrication of antimicrobial products, comprising die cutting. More specifically, FIG. 4 depicts method 400 for processing an antimicrobial material sheet for fabrication of antimicrobial products; although method 400 is exemplarily shown with a series of steps in one particular sequence, method 400 may include fewer or more steps, and or steps in alternative sequences, without deviating from the scope of the present invention. Method 400 involves a creating cured antibacterial sheets, which may then be die-cut into products that will have antimicrobial properties.

In step 401, a preparation sheet including at least a layer of a copper alloy fabric having antimicrobial properties and at least a layer of a polymer composition such as a silicone composition may be created as discussed in other methods above. In step 402, the preparation sheet may be cured to form an antimicrobial material sheet.

In exemplary embodiments, the curing process may include a roto curing process as discussed above. In step 403, a portion of the antimicrobial material sheet may be die-cut to form at least a portion of a product. Alternatively, an entire sheet may be used for creating surfaces, flooring, or any other type of product or surface that includes antimicrobial properties.

Furthermore, the curing may be achieved in any number of ways without limiting the scope of the present invention. Exemplarily, the curing process may include achieving cohesive failure so that the polymer or elastomer is properly adhered to the antimicrobial fabric. In exemplary embodiments, a general-purpose silicone compound and a bonding agent may be utilized, wherein the silicone compound comprises a larger percentage of the composition and the bonding agent comprises a much smaller percentage of the composition.

In exemplary embodiments, the silicone compound may form about 95% of the polymer layer, a bonding agent may be a low percentage liquid bond promoter that forms about 4% of the polymer layer, a catalyst may form about 0.5% of the polymer layer, and the remaining portion may comprise of a desired color to provide the finished product.

In accordance with the present invention, the final product may comprise a wide variety of hardness. In some exemplary embodiments, the silicone compound may achieve a rigidity so that the product is suitable for solid, sturdy objects. Conversely, in other exemplary embodiments, a softer hardness may be employed so that softer or even spongy consistencies can be achieved, in order to provide a material suitable for products that may require flexibility and less rigidity. For example, and without limiting the scope of the present invention, softer products may include exercise devices such as yoga mats that employ antimicrobial properties.

In exemplary embodiments, a coupling agent may be used when employing a silicone polymer. For example, a liquid prime coat made from a mixture of Heptane and Vinyltrimethoxysilane may be utilized. In such embodiments, a bond promoter may be applied to the fabric then dried. This can then be used with unmodified silicone compounds to achieve a bond when cured, either by compression molding or by a calendering processes. In other embodiments, a modified silicone compound may be used. This eliminates the process or need to prime coat the special fabrics. Depending on the application and manufacturing process, one way may be preferred over the other.

Figure 5:
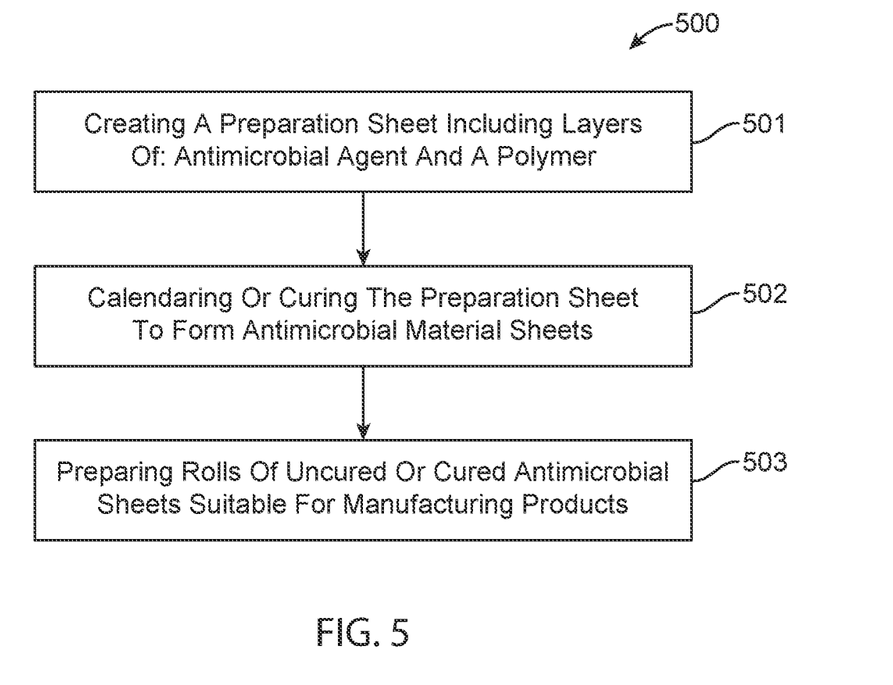
FIG. 5 is a flow chart depicting an exemplary method of providing cured or uncured antimicrobial material sheets to manufacturers for fabrication of antimicrobial products.

FIG. 5 is a flow chart depicting an exemplary method of providing cured or uncured antimicrobial material sheets to manufacturers for fabrication of antimicrobial products. More specifically, FIG. 5 depicts method 500 for providing cured or uncured antimicrobial material sheets; although method 500 is exemplarily shown with a series of steps in one particular sequence, method 500 may include fewer or more steps, and or steps in alternative sequences, without deviating from the scope of the present invention.

In step 501, a preparation sheet including at least a layer of a copper alloy fabric having antimicrobial properties and at least a layer of a polymer composition such as a silicone composition may be created as discussed with respect to other methods above. In step 502, the preparation sheet may be calendered or cured to form a desired version of an antimicrobial material sheet. Finally, in step 503, rolls of uncured or cured antimicrobial sheets may be provided to manufacturers or distributors alike. In some exemplary embodiments in accordance with the methods mentioned above and disclosed in this specification, rolls of the antibacterial material sheets may be provided to manufacturers for fabricating products. In some exemplary embodiments, both cured and uncured rolls of antimicrobial material sheets may be provided. In some exemplary embodiments, the hardness of the material sheets will differ and thus suitable for a wide range of products. For example, and without deviating from the scope of the present invention, some compositions may comprise a hardness suitable for fabrication of hard rigid products, while in other embodiments compositions may comprise a softer, sponge-like composition suitable for fabrication of flexible products.

Figure 6:
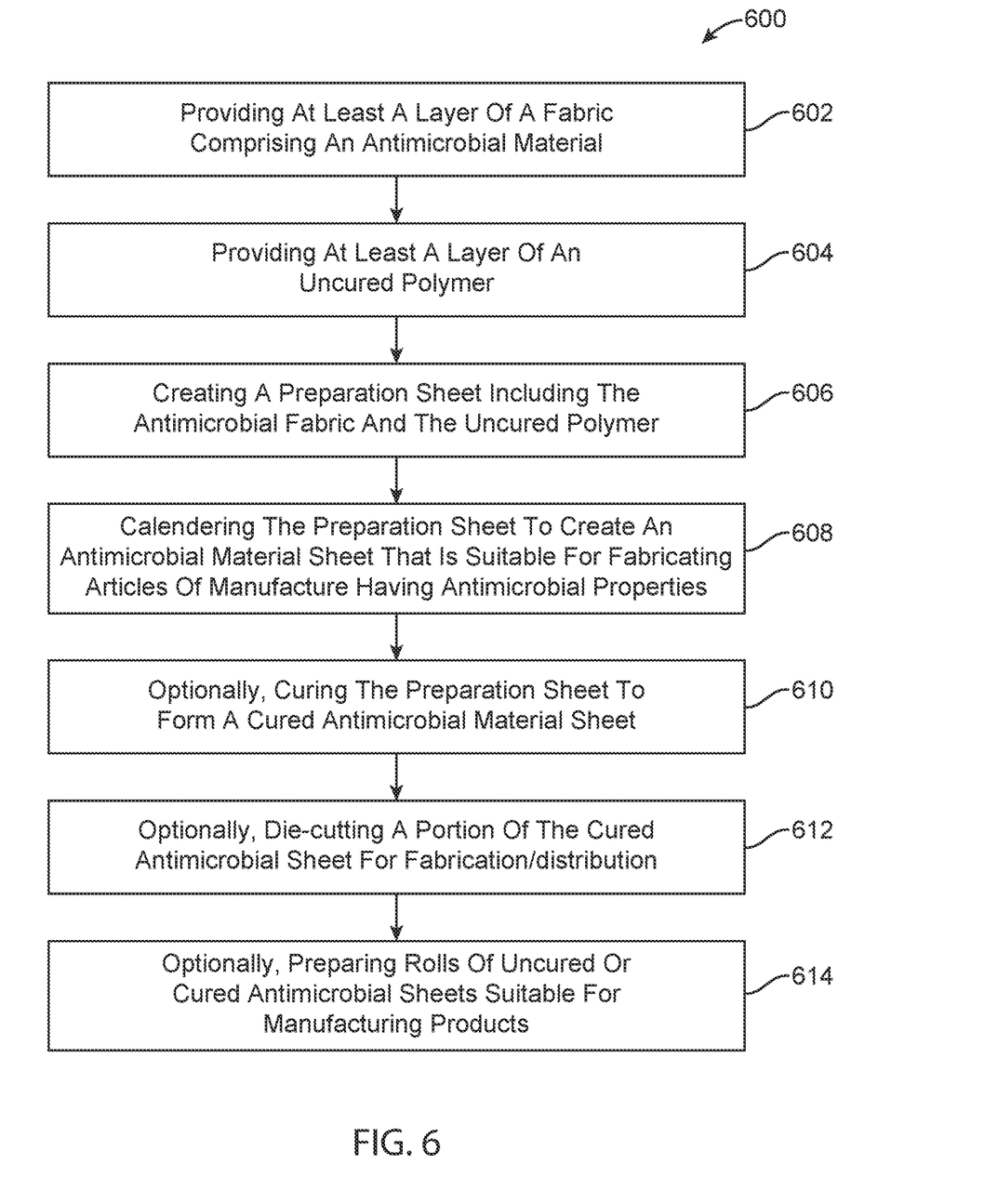
FIG. 6 is a flow chart depicting an exemplary method for manufacturing articles that comprise of antimicrobial properties.

FIG. 6 depicts method 600 for manufacturing articles that comprise of antimicrobial properties. In step 602, at least a layer of a fabric comprising an antimicrobial material is provided. In step 604, at least a layer of an uncured polymer is provided. In step 606, a preparation sheet is created, and it is the preparation sheet including the copper-alloy fabric and the uncured polymer. In step 608, the preparation sheet is calendered to create an antimicrobial material sheet that is suitable for fabricating articles of manufacture having antimicrobial properties. In step 610, optionally, the preparation sheet can be cured to form a cured antimicrobial sheet. In step 612, at least a portion of the cured antimicrobial sheet for fabrication or distribution by die-cutting. In step 614, rolls of cured or uncured antimicrobial sheets are prepared for manufacturing the products having antimicrobial properties. Optional steps are carried based on the requirements of the end-user.

The material involved in preparation of antimicrobial sheet and the process employed for curing, calendaring and molding are explained as follows.

According to the present invention, the material utilized in the layer of polymer is disclosed as follows. The layer of polymer composition includes silicone or silicone-based compounds. Silicone or silicone-based compound has overall good weatherability, resistance to heat and cold, excellent electrical properties, good chemical and flame resistance. Silicone or silicone-based compound is currently used in nearly every industry to improve the function and performance of products, including electronic components and office automation equipment. Further, it is used in the automotive and food industries, for healthcare, as well as household goods and for personal and leisure related items.

Further, silicone has good protection against UV, ozone, wind and rain for extended periods of time with no changes to its physical properties. It has resistance to oils, solvents and many cleaning products. It has very good resistance to moisture and steam, as well as salt water, when formulated with the appropriate curing agent and/or use of post curing.

Specifically, in another embodiment of the present invention, the layer of polymer composition includes one or more materials from a group including silicone rubber, methyl vinyl silicone (VMQ), phenyl containing methyl vinyl silicone (PVMQ), and fluorine containing methyl vinyl silicone (FVMQ).

In another embodiment, the layer of polymer composition includes methyl vinyl silicone (VMQ). Typical physical properties of VMQ includes high strength, durometer ranging from 10A to 90A Shore hardness, of the cured elastomer, tensile strength ranges from 200 to 1300 psi, elongation ranges from 50 to 500+ percent, tear strength ranges from 40 to 220 ppi. Compression set ranges from 5 to 50 percent. Compression property may also vary based on time and temperature of compression. The temperature range for VMQ includes, but not limited to −57 C to 177 C, (−70 F to 350 F). It is anticipated that many of the real time uses for the purposes being outlined here however, will be near ambient temperatures.

In one embodiment, depending on the fabric and antimicrobial application, the layer of polymer composition including silicone or silicone-based compound includes a bonding agent. In one embodiment, the bonding agent incudes Silquest A-172 silane, composed of Vinyltris(2-methoxyethoxy) silane and 2-Methoxyethenol. In another embodiment, the bonding agent may be used for some specific silicone compounds with the conductive metalized fabric combinations where necessary. This will ensure optimal bond strength or adhesion, (referred to as cohesive failure), to the various specified metalized fabrics specified. A cohesive failure bond is when attempted separation between the silicone to fabric lamination results in tearing of the elastomer, instead of peeling the fabric off the silicone interface.

As silicone does not corrode other materials, silicone makes a good candidate for lamination to metal plated fabrics. Further silicone is inert chemically and mild to the touch, which makes the material optimal for recreational/leisure items and everyday individual personal use products. Further, silicone has high transparency and coloring properties. Thus, the present invention could be able to provide articles of any color. Further, enables to provide articles according to federal standard color codes.

The method of compounding and mixing is detailed as follows. In one embodiment, the silicone rubber, fillers, processing modifiers, vulcanizing agents and other additives including, but not limited to, pigments are mixed. In one embodiment, conventional rubber equipment is used for mixing silicone rubber. In one embodiment, internal mixers such as Banbury® mixer used for internal mixing. The internal mixers enable larger portion size, better batch consistency along with efficient manufacturing cost. The temperature of the batch is carefully monitored during the mixing cycle to prevent the curing agent from activating. The maximum temperature also varies depending on the vulcanizing agent.

In one embodiment, mills are used for open roll mixing. Generally, the mills are water cooled. The speed of the rolls is often different with friction ratios of 1.2:1 to 1.4:1. With proper mixing instructions and specified time, the ingredients are thoroughly mixed. Further, mills require high-power input. For example, 1.5 m mill with rolls 1.5 m long, will handle about 50 kg of rubber at a specific gravity of 1.0-1.2 g/cc and will require 45-75 kw, and 2.1 m mill will handle 100-150 kg of compound and needs a motor of 1.5-225 kw.

Further, batch control testing is performed to ensure compliance to the customers material specifications. Rubber mixers use ASTM test methods and equipment such as Rheometers to measure the batch cure characteristics and ASTM test buttons and slabs to test physical properties. Further, prior to the initial production mixing, full material specification testing that requires heat aging and fluid resistance, low temperature characteristics and many other material capability verifications, using ASTM standard tests, are performed to qualify the compound.

According to the present invention, the fabric utilized for the preparation of the antimicrobial sheet is disclosed as follows. In one embodiment, the fabric may be a metalized fabric, also referred to as technical or smart textiles, consist of fibers and fabrics developed and produced for their specialized features and functional material properties, particularly electrical conductivity. In one embodiment, the fabric is selected from a group including, but not limited to, wool, silk, cotton, bamboo, asbestos fiber, synthetic nylon, polyester, acrylic and rayon. The group may further include knit tricot, knit scrim, knit continuous loop, non-woven, point bonded, rip stop, and woven taffeta. This fusion of fabric and metal alloy such as woven, non-woven and knits are supplied in various widths up to 100 inches. Typical supply is 42-52 inches wide for a rubber to fabric process described in this work instruction. The fabric is appropriately tested for their antimicrobial activities. In yet another embodiment, a copper fabric may be used for preparation of antimicrobial sheet. The copper fabric exhibits remarkable antimicrobial, anti-viral and anti-fungal capabilities. This occurs naturally through the discharge of copper ions, (electrically charged particles) when microbes, transported by touching, sneezing or vomiting end up on a copper fabric surface. The ions restrict cell respiration, poke holes in the bacterial cell membrane or decompose the viral coating and destroy the DNA and RNA inside. This process or property is critical as it means that no mutation can occur, restricting the microbe from developing variant resistance to copper.

Thus, the copper alloys kill superbugs like MRSA and those from prominent ESKAPE category of pathogens that often cause hospital-acquired infections (HAI's). Transmission of antibiotic resistant genes from resistant bacteria to other bacteria is also blocked because the genes are killed. These detrimental properties are further strengthened by the bacteria since they discharge hydrogen peroxide, this counters with the copper ions to form fiercely reactive oxygen, which also invade and dismantle the microbes in the various spaces.

Further, viruses like norovirus, and others like influenza mutate quickly and difficult for vaccines to stay effective and they require reformulation. Copper fabric surfaces however can clear them out, regardless of the timely variations in the microbes. Hence, there is an expanding international interest in the health care sector over antimicrobial resistance and the deadly complications that occur with typical infections that result from simple minor operations. Many healthcare institutions and personnel refer to silver as the most common antimicrobial metal. However, moisture needs to coexist with a solid silver for it to have an antibacterial effect like copper does on high touch surfaces. Further, cost efficiency plays an important role to the proposition of using silicone to copper fabric.

The cost of producing an elastomeric sheet material covered with a highly antimicrobial fabric that can then be used to make large and small parts, components and area coverings compared to the cost of installing solid alloy fittings is clear. It should also be noted that fabric will not be subject to deep scratches that can occur in solid alloy, particularly the softer metals like copper.

Sometimes, hand-gel sanitizers seem like a cheaper option, however, they do not kill all microbes including the Norovirus. Also, cleaning of surfaces occurs probably once a day, while copper works 24/7, so it is surely an important consideration in the fight to keep critical care environments at home, work and health care facilities clean. The present invention aims to encourage a simple and cost-efficient approach to help control infection as nations are waking up to the necessity, particularly in this last 12 months of pain and suffering caused by transmission of the Covid 19, Corona virus.

According to the present invention, the pre-production treatment of fabric is disclosed as follows. A virgin, untreated metalized fabric is received in rolls of typically 45-55 inches wide by 50 to 100 Linear yards continuous roll. This fabric is first coated with a prime coat, which is a colorless liquid composed of: Vinyltrimethoxysilane, Titanium tetrabutanolate, Heptane, Methanol, and Butan-1-01 using a dip and flow coating process. The uncoated fabric enters the dip tank at a 45-degree angle, passes under an idler arm at the bottom of the tank, and then up into a vertical drying oven by hot air, removing the solvent at 150-175 degrees F.

A clear wash coat of a (VMQ) silicone is prepared and sheeted very thin and cut into small pieces and soaked overnight in just enough solvent to cover the compound. The mixture is then stirred with a propeller mixer until uniform. The remaining solvent is then added, with mixing, in small measured quantities. This dispersion is filtered through an 80-150-mesh screen depending on the consistency before use. Benzoyl peroxide, in crystal form, is typically used for catalyzing. Benzoyl peroxide has a high enough decomposition temperature and a low enough vapor pressure to allow the use of heat to flash off the solvent after coating. The crystalline benzoyl peroxide is then added to the dispersion in the form of a 5% solution in toluene. It is critical to prevent overheating during or after the addition of the peroxide.

Using dip tanks and drying ovens, as with the fabric priming process, the previously primed and dried fabric is fully immersed into the clear silicone wash coat. In the case of some synthetic metalized cloth, vulcanization takes place in a coating oven zone set at 300-400 degrees F., and 250-300 degrees F. in the case of metalized organic fabrics. When certain metalized, high temperature synthetic cloth is being coated, an additional oven zone, maintained at 480-600 degrees F. is used. This last temperature exposure removes any traces of volatiles, including the peroxide decomposition products. Maximum bond of the wash coat and optimal electrical properties are developed in this final heat exposure. This dispersion coating process is rather fast, with speeds of 10-20 feet per minute.

According to the present invention, the method of calendering is disclosed as follows. Calendering is employed for producing long production runs of evenly thick sheets of silicone rubber. The sheeting includes a metalized reinforcing fabric on one side using a 3-roll calender. In another embodiment, the sheeting may have metalized fabric on both sides using a 4-roll calender. The resulting product gets its strength from the fabric and its flexibility, good electrical properties and moisture resistance from the silicone rubber. The metalized fabric is highly electrically conductive, possessing the functional antimicrobial properties. Silicone rubber should be processed at slower speeds. 0.2 to 2 feet per minute is best for start-up until even release from the rolls is assured and then running production speeds are usually around 5 to 10 feet per minute.

Figure 7:
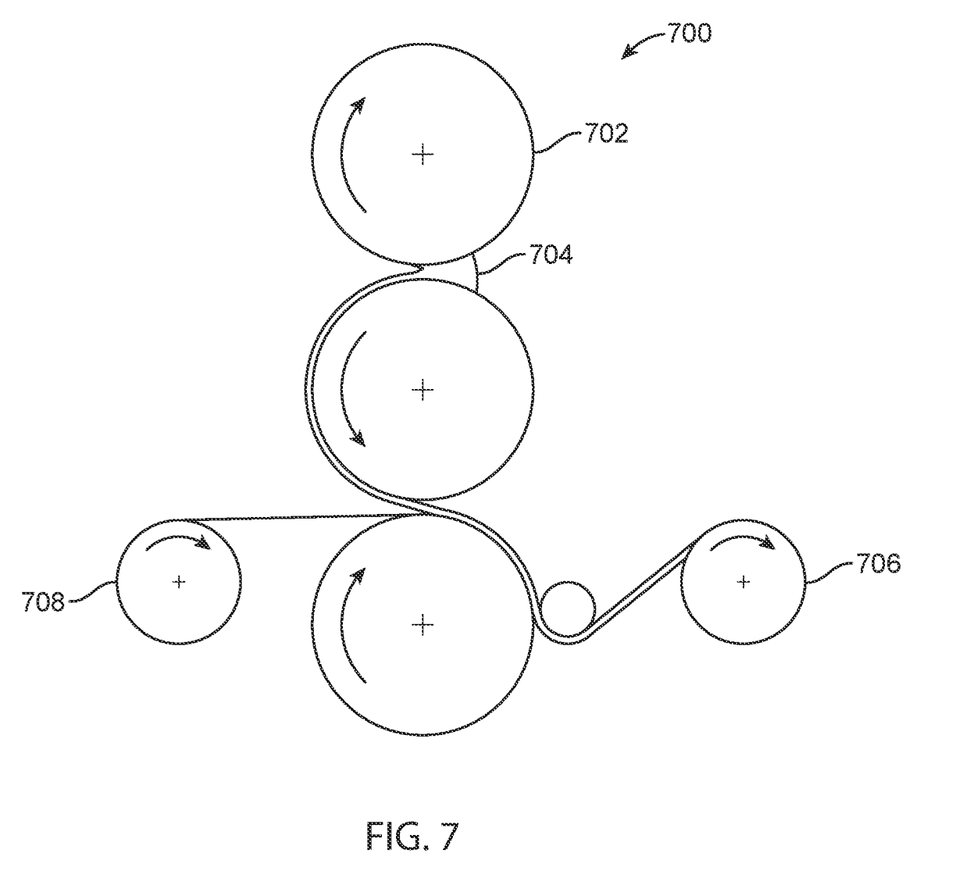
FIG. 7 is an exemplary three-roll calender assembly, according to an embodiment of the present invention.

A three or four roll calender is made up of the several rolls built into a framework. The rolls revolve to produce sheeting, and by adjusting the gap between the rolls, different thicknesses of sheeting are attained. The silicone stock is fed into one side of the nip and is flattened, and consequently emerges as a sheet which is pulled from the roll by some mechanical means. Because of its versatility, referring to FIG. 7, the three-roll calender assembly 700 are more widely used for sheeting, as well as other basic calendaring functions. The assembly 700 includes three-roll calenders 702, liner let-off units 708 and wind-up units 706. Feedstock 704 are fed through the three-roll calenders 702. The top roll calendar of calenders 702 is shown in an exemplary clockwise rotation. From this view, it may be appreciated that the feedstock 704 or the bank of silicone rubber, is being continuously fed into the calendar assembly 700. Moreover, the fabric let off stand 708 is shown accommodating the rolled metalized fabric 701 under accurate tension and speed control. The wind-up unit 706 for the calendared material is exemplarily a tension and speed coordinated spindle unit for incorporating a reusable anti-stick liner between wraps of the calendared material.

The thickness control is managed by use of screw-downs and may be further refined by automatic control systems using thickness sensors. In one embodiment, to avoid excessive variation in thickness, a basic technique called grinding or crowning of the roll faces to compensate for any deflection is employed. The rolls are mechanically ground so that the diameter at the center is greater than that at the ends of the roll face. Under the required load, the "crowned" rolls deflect so that the gap between them is more consistent. The rubber supply in the nip, called the bank of the calendar, needs to be fed continuously by some manual or automatic means to prevent tears in the finished sheet. The ideal bank is relatively small and is constantly affecting a rolling action from end to end of the nip. Usually, the silicone rubber stock is warmed up on an adjacent mill and is then either fed to the calendar nip in the form of a continuous strip or in the form of rolled "pigs" which the operator is supplied from adjacent equipment.

In one embodiment, the secondary components of the calender comprise fabric let off stands, heating and cooling drums, windup units and thickness gauging equipment. The fabric let off stands to accommodate the rolled metalized fabric under accurate tension and speed control. The windup units for calendared material are made up of speed/tension coordinated spindle units for incorporating a reusable "anti-stick" liner, such as cellophane or Kotasil, between wraps of the material. In one embodiment, belt-conveyor tables can be used where windup with liner is managed on a surface-driven central core. The thickness gauging equipment is employed for final sheet production. In another embodiment, calipers are used for final sheet production. In yet another embodiment, a sensor-based system that utilizes emission characteristics of the Strontium 90. This system is commonly called a Beta Gauge. The degree of process management from such systems can range from a mere readout of thickness to complete control of the calender and its auxiliaries. However, for any given process the financial balance of total equipment cost vs. benefits in quality and material expense efficiencies is also considered.

According to the present invention, curing of the silicone to fabric calendered sheeting utilizing autoclave is disclosed. In this stage, the completed calendered uncured silicone/fabric cover is now in the form of rolls of tightly wrapped layers of sheeting. Without limiting the scope of the invention, in one embodiment, these rolls are cured in an autoclave, which is a cylinder-shaped pressure vessel. The door is a critical component of the autoclave allowing the operator to open and close quickly and easily. The door is ensured to meet strict safety requirements. Among the various safety standards is the ASME pressure vessel code. The most important concern is the doors operation. It must seal tightly against rated pressure at the shells highest temperature. Regular testing of the interlock mechanisms to prevent door opening under pressure is required.

Further, steam is used as a common process medium. In another embodiment, a combination of steam with air or inert gas, "dry heat" by either electrical heaters, steam or hot oil generated autoclave jackets, or hot circulating gases are also used. A non-jacketed type produces open steam that condenses on the walls of the autoclave and on the surface of the calendered rolls being vulcanized (cured). The jacketed autoclaves have a double wall. Steam is sent into the jacket to produce heat. There will be no direct contact of steam with the calendered rolls. An inert gas (i.e., nitrogen) is introduced to the autoclave to eliminate oxidation. Oxidation can lead to polymer degradation and needs to be eliminated. Because gas is a poor conductor of heat, the curing time is increased. A combination of temperature and time make up the vulcanizing process in an autoclave. Curing times are usually longer than necessary since there is no indication of when the cure is complete.

Once the autoclave is loaded with the calendered fabric covered silicone rubber sheet rolls and connections are made to the autoclave, the door is closed and locked. Pressure-temperature levels for instance will be 100 psi saturated steam at sea level which will equal approx. 170 degrees C. (340 degrees F.) temperature. This will be used for a typical high temperature peroxide silicone cure system.

This is applied until the required level is attained. A circulation fan then starts when the temperature is reached and maintained. A time soak at that temperature will begin and continue for the required duration of time. When the soak period ends, the cooling process brings the temperature down to a set value at a specified ramp rate. The vessel is depressurized, and the air circulation fans are stopped.

The autoclave doors are opened, and the cured rolls are rolled out on the rails to be transferred to the unwinding equipment. The cured metalized covered silicone sheeting can then be unrolled on production tables and die cut to the customer required profiles. In another embodiment, continuous lengths of the sheeting may also be the final product used to protect larger surface areas with the advantage of the cushioned silicone rubber characteristics. These can then be provided with an acrylic pressure sensitive adhesive liner with removable Kraft paper that can be affixed to the rubber side. The various silicone elastomer sheets at the produced thicknesses from, but not limited to 0.030" on up to 0.500" can then be attached to the designated high touch surface areas for its critical end use. The finished sheet may not need the PSA and is ready to be used for its intended purpose in sheet or die cut form as desired by the end user.

In one embodiment, the rotocure is used for curing the preparation sheet to form a cured antimicrobial material sheet and detailed as follows. A rotocure, or rotary curing press is devised for continuous curing of rubber sheet products. The normal speed range of 15 to 150 feet/hour (4 to 45 m) and a contact length against the drum of 3 minutes. Cure time is typically about 20 minutes for these silicone compounds and metallized fabric layups. The rotocures are typically positioned near the calender.

A rotocure line consists of a winding let-off unit, rotocure, cooling unit, equipment for edge trimming of product and winding up equipment. From the winding let-off apparatus, the semi-finished calendered silicone with metalized fabric cover is directed on to the lower roll. From there on to a pressing space between the heating drum and thrust pressing belt, where it gets pressed and cured. The primary curing machine for sheeting is usually the rotocure for manufacturers. This machines physical set up consists of a large steam heated, revolving steel drum, that are partially enclosed by an endless steel band, which makes up close to ⅔ of the circumference of the drum through the continuous action of two conducting rollers and a tension pulley. The drum is heated with steam to a temperature of 150-200 C (300-400 degrees F.). Further, a heating plate covering approximately half of the surface of the drum and which gives some additional heat, but mostly prevents loss of heat.

Rotocure operation is a balancing act, ensuring that all the various parts are working in accurate alignment. It is critical to maintain all processing parameters correctly. A very minimal change in the steel belt or heated roll temperature controlling the curing of the sheet can cause unevenly cured sheet which will lead to imperfections causing rejections of the finished product. The calendered rubber sheet is placed between the drum and the band at the bottom or lower roller. With guidance and traction from the transitioning pully, the band is self-adjusting so that approximately 45 psi (0.3 mpa) pressure is obtained between the band and drum. Depending on the overall sheet thickness, linear drum speeds vary from 0.5-200 m of cured material per hour (1.5-650 feet per hour). The interchangeable drums achieve a normal diameter of 2-5 feet (750-1500 mm) and a width of between 4-8 feet (1200-2500 mm). Typical curing time is between 4 and 35 minutes when a speed of 16-160 feet (5-50 meters) per hour and a contact length against the drum of 3 minutes, depending on the silicone compound and curing agent used. High hourly output can be a great advantage for using a well-maintained and correctly operated rotocure.

According to the present invention, various profiles for specific uses for the antimicrobial silicone articles are produced using compression molding and are discussed as follows. The compression molding is used as an alternative to die-cutting of gasket type parts from the Autoclave or Rotocured vulcanized finished sheeting. The uncured silicone compound, built to a certain thickness and shape, can be prepped and covered with the metalized fabric then placed into specially designed tooling and compression molded in a press. In one embodiment, the press used for compression molding is robustly constructed and with two or more platens which are heated either electrically or more often saturated steam under pressure. The platens are brought together by pressure that is applied using hydraulics either by way of water or oil to give loading of 75 Kgf/cm2 (1066 psi) to 150 Kgf/cm2 (2100 psi) of used internal mold cavity area. Making of the molds are generally based upon presses available, which allow proper closure and minimum or thin flashing.

Compression molding is the most widely used method for molding silicone rubber parts. The presses are run at pressures of 800-3000 psi and temperatures of 220 to 370 degrees F. The three molding variables that must be controlled are temperature, speed of mold closing and pressure. The temperature will depend on the choice of peroxide curing agent. Platen temperatures often must be decreased, if the mold temperature increases after repeated molding cycles to prevent scorching. The speed of the mold closing must be adjusted to allow for adequate filling of the mold and escape of all air, but without scorching. The pressure must be set to avoid thick flash but low enough to prevent excessive wear and tear on the mold.

The molded silicone part will vary in size if the pressure is not consistent, due to the great compressibility of silicone. For optimal use of the material in compression molding, the prep, or preform must be shaped and sized to minimize wasted flash while also controlling and stabilizing the metalized fabric cover that is placed (partially stuck to the uncured silicone) within the mold during the curing process. The mold shrinkage of silicone rubber must be accounted for. It is approximately 3% and affected by the silicones thermal expansion, which is about 18 times that of steel. The shrinkage largely depends on molding temperature. The release of volatiles during the cure and post cure, if post cure is necessary, also affects how the part will shrink. It should be noted that the uncured calendered sheeting can also be used to lay up and fabricate a part to be used for compression molding.

According to an embodiment, oven curing process employed for curing the preparation sheet is discussed as follows. There are certain silicone rubber compounds that may involve an oven post-cure after vulcanization and fabrication. Such a post-cure (post-bake) is desirable to improve the mechanical properties (i.e., compression set, electrical properties, and reversion resistance of the finished part. The content of volatile components is also reduced or eliminated. These include catalyst decomposition by-products and low molecular weight siloxane that evaporates. The degree of the post-cure (if required), depends on the desired properties and the product use application. For most applications a cure of one or more hours at 28 degrees C. (50 degrees F.) above the service temperature is effective. Any production related processes involving the metalized fabric or the vulcanized silicone, that would result in a noticeable or undesirable smell, can be removed by a post-bake. Electric ovens should have a circulation rate of (2 cubic ft)/minute of fresh air per pound silicone rubber). This fresh air exchange ratio of the hot air circulating ovens is also required to prevent the formation of flammable air/, siloxane mixtures, that can occur at elevated temperatures in an oven that is not properly used for post-cure purposes. Some metal fabric color changes can result from a post bake. Copper fabric, for example will develop a deeper, more vibrant copper appearance. Undesirable changes in electrical properties for purposes of antimicrobial effectiveness have not been observed after post-cure.

Figure 8:
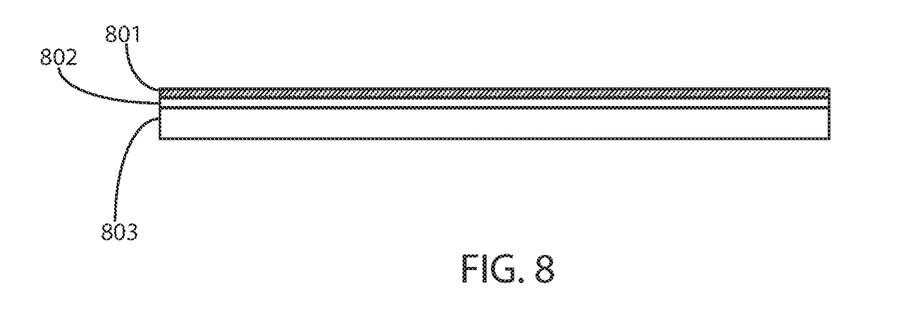
FIG. 8 illustrates a cross-sectional view of an exemplary metal plated fabric prepared using a primer and silicone wash coating to produce binding to an unmodified silicone compound.
Figure 9:
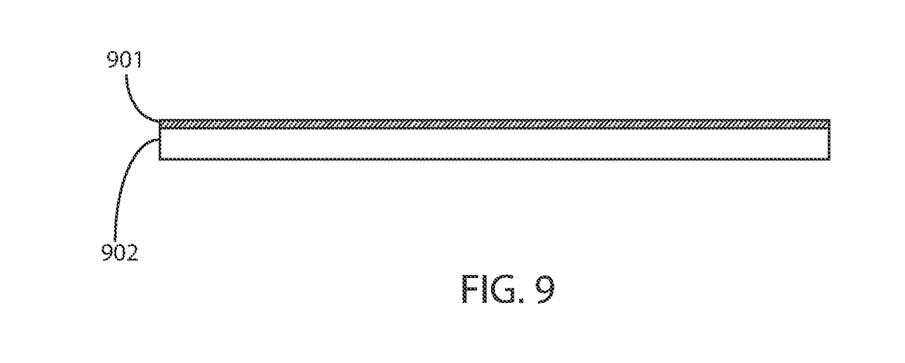
FIG. 9 illustrates a cross-sectional view of an exemplary untreated and unprimed metal plated fabric prepared with a modified silicone compound to produce bonding between the polymer and the fabric.

Turing now to the next set of figures, FIG. 8 illustrates a cross-sectional view of an exemplary metal plated fabric prepared using a primer and silicone wash coating to produce binding to an unmodified silicone compound; FIG. 9 illustrates a cross-sectional view of an exemplary untreated and unprimed metal plated fabric prepared with a modified silicone compound to produce bonding between the polymer and the fabric.

In FIG. 8, as may be gleaned from the exemplary cross-section of a metal plated fabric in accordance with the present invention, a top layer 801 may include a metalized antimicrobial fabric in accordance with the present invention. In some exemplary embodiments, such as the one shown in this view, a middle layer may comprise a primer and silicone wash coat treatment to promote adhesion to the polymer layer (i.e., a silicone compound layer) below. The third layer 803 may comprise a silicone compound layer, which has not been formulated or modified using a silane bond promoter additive. Notably, a priming of the fabric without the silicone wash coat process can also produce the required adhesion. This can be prepared in this manner depending on the end use applications, as well as possible manufacturing constraints or conveniences. In exemplary embodiments, a fabric preparation with primer and wash coat may be useful for preserving metal-plated fabrics (where the metal is copper, for example) from oxidizing in their natural timeframes.

In FIG. 9, as may be gleaned from the exemplary cross-section of the metal plated fabric in accordance with another embodiment of the present invention, a top layer 901 may include a metalized antimicrobial fabric, which is prepared without primer or wash coat treatment. A bottom layer 902, for example a silicone compound layer has been formulated with a silane modifier to promote adequate adhesion to the metalized antimicrobial fabric layer. Alternatively, depending on the thickness of the silicone layer, fabric type and thickness, a combination of these preparations can be utilized to produce the required lamination when cured.

A method for manufacturing articles that comprise antimicrobial properties has been described. The foregoing description of the various exemplary embodiments of the invention has been presented for the purposes of illustration and disclosure. It is not intended to be exhaustive or to limit the invention to the precise form disclosed. Many modifications and variations are possible considering the above teaching without departing from the spirit of the invention.

What is claimed is:

1. A method for preparing antimicrobial sheets for manufacturing articles having antimicrobial properties, comprising the steps of:
   providing a first metalized fabric including a first metal material, the first metal material including a first metal material surface area;
   coating the first metalized fabric with first silicone to form a first silicone treated metalized fabric, wherein the coating of the first metalized fabric includes coating at least a portion of the first metal material surface area with the first silicone, and wherein the first silicone promotes bonding between the first silicone treated metalized fabric and a first sheet of uncured polymer;
   providing a first sheet of uncured polymer, the first sheet of uncured polymer in solid form and including a top surface, a bottom surface opposite the top surface, and corresponding lateral surfaces extending between the top surface and the bottom surface, the entirely of the top surface and the entirety of the bottom surface unattached from the first silicone treated metalized fabric;
   bonding, using the first silicone and by calendering, the first silicone treated metalized fabric to the top surface or to the bottom surface of the first sheet of uncured polymer to create an antimicrobial material sheet suitable for fabricating articles of manufacture having antimicrobial properties.

2. The method of claim 1, further comprising:
   prior to bonding the first silicone treated metalized fabric to the top surface or to the bottom surface of the first sheet of uncured polymer, providing a second metalized fabric including a second metal material, the second metal material including a second metal material surface area;
   coating the second metalized fabric with second silicone to form a second silicone treated metalized fabric, wherein the coating of the second metalized fabric includes coating at least a portion of the second metal material surface area with the second silicone, and wherein the second silicone promotes bonding between the second silicone treated metalized fabric and the first sheet of uncured polymer;
   combining the second silicone treated metalized fabric with the first silicone treated metalized fabric and the first sheet of uncured polymer.

3. The method of claim 1, further comprises a step of: curing the antimicrobial material sheet to form a cured antimicrobial material sheet.

4. The method of claim 1, further comprises a step of: employing a compression molding process to a portion of the antimicrobial material sheet in order to form at least a portion of the article.

5. The method of claim 1, further comprises a step of: employing die-cutting process to form at least a portion of the article from at least a portion of the antimicrobial material sheet.

6. The method of claim 1, further comprises a step of: preparing rolls of uncured or cured antimicrobial sheets suitable for manufacturing articles having antimicrobial properties.

7. The method of claim 3, wherein the curing step is performed utilizing roto curing process.

8. The method of claim 3, wherein step of curing is performed using oven curing or autoclave.

9. The method of claim 3, wherein the step of curing utilizes the first silicone, a coupling agents, and a bonding agent.

10. The method of claim 1, wherein the first metal material includes at least one of copper, copper alloy, silver, or silver alloy.

11. The method of claim 1, wherein the uncured polymer is formed using at least one elastomer.

12. The method of claim 1 further comprising: treating the first metalized fabric with a prime coat including Vinyltrimethoxysilane, Titanium tetrabutanolate, Heptane, Methanol, and Butan-1-ol.

13. The method of claim 1 wherein the coating the first metalized fabric with first silicone includes dipping the first metalized fabric into a dip tank filled with the first silicone.

14. The method of claim 13 wherein dipping the first metalized fabric into a dip tank filled with the first silicone includes fully immersing the first metalized fabric into the first silicone.

15. The method of claim 1 wherein the first sheet of uncured polymer is formed using at least one of silicone rubber, methyl vinyl silicone (VMQ), phenyl containing methyl vinyl silicone (PVMQ), and fluorine containing methyl vinyl silicone (FVMQ).

16. The method of claim 1 wherein the first sheet of uncured polymer is formed using a silicone compound.

17. The method of claim 1 further comprising:
treating the first metalized fabric with a prime coat including Heptane and at least one chosen from the group of Vinyltrimethoxysilane, Titanium tetrabutanolate, Methanol, and Butan-1-ol.

18. A method for preparing antimicrobial sheets for manufacturing articles having antimicrobial properties, comprising the steps of:
providing a first metalized fabric including a first metal material, the first metal material including a first metal material surface area;
coating the first metalized fabric with first silicone to form a first silicone treated metalized fabric, wherein the coating of the first metalized fabric includes coating at least a portion of the first metal material surface area with the first silicone, and wherein the first silicone promotes bonding between the first silicone treated metalized fabric and a first sheet of uncured polymer;
providing a feedstock of solid uncured polymer and passing only the feedstock of solid uncured polymer between two rollers to form a first sheet of only uncured polymer;
bonding, using the first silicone and by calendering, the first silicone treated metalized fabric and the first sheet of only uncured polymer together to create an antimicrobial material sheet suitable for fabricating articles of manufacture having antimicrobial properties.

19. The method of claim 18, further comprising:
prior to bonding the first silicone treated metalized fabric to the top surface or to the bottom surface of the first sheet of uncured polymer, providing a second metalized fabric including a second metal material, the second metal material including a second metal material surface area;
coating the second metalized fabric with second silicone to form a second silicone treated metalized fabric, wherein the coating of the second metalized fabric includes coating at least a portion of the second metal material surface area with the second silicone, and wherein the second silicone promotes bonding between the second silicone treated metalized fabric and the first sheet of uncured polymer;
combining the second silicone treated metalized fabric with the first silicone treated metalized fabric and the first sheet of uncured polymer.

20. The method of claim 18, further comprises a step of: curing the antimicrobial material sheet to form a cured antimicrobial material sheet.

21. The method of claim 18, further comprises a step of: employing a compression molding process and/or a step of a die-cutting process to a portion of the antimicrobial material sheet in order to form at least a portion of the article.

22. The method of claim 18 wherein the first sheet of uncured polymer is formed using a silicone compound.

\* \* \* \* \*